Dec. 23, 1941.  H. WHITWORTH  2,266,944
PACKING AND METHOD OF MAKING THE SAME
Filed June 21, 1939

Inventor
Harry Whitworth
By S. Jay Teller
Attorney

Patented Dec. 23, 1941

2,266,944

UNITED STATES PATENT OFFICE 2,266,944

PACKING AND METHOD OF MAKING THE SAME

Harry Whitworth, Hartford, Conn., assignor to Colt's Patent Fire Arms Manufacturing Company, Hartford, Conn., a corporation of Connecticut Application June 21, 1939, Serial No. 280,373

7 Claims. (Cl. 251—160)

The main object of this invention is to provide a molded packing having a nut lock at least semi-permanently associated therewith.

A further object is to provide a method of making a packing of the above character wherein a nut lock of the split washer type is associated with the molded body of the packing during the molding thereof.

Other and more specific objects of the invention will be apparent from the following description to those skilled in the art.

In the accompanying drawing I have shown the now preferred embodiment of the invention, but it will be understood that the drawing is intended for illustrative purposes only and is not to be construed as defining or limiting the scope of the invention, the claims forming a part of this specification being relied upon for that purpose.

Figure 1:
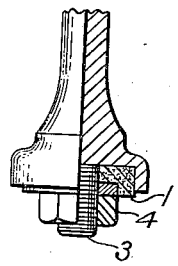
Fig. 1 is an elevational view, partly in section, of a packing incorporating the principles of the invention, it being shown in association with a valve stem.

The principles of the invention are applicable to packings of various types and forms, but for the purposes of this specification they are shown in connection with a disc type of packing as commonly used in valves.

Referring to Figs. 1 to 4, there is shown a disc type packing having a molded hard body 1 with a hole 2 therethrough for receiving a threaded valve stem 3 having a nut 4 thereon for securing the packing on the valve stem. In order to prevent loosening of the nut 4, a nut lock is at least semi-permanently associated with the packing. The illustrated nut lock 5 is of the well known split washer type, that is, a metallic helix which is compressed or flattened as the nut is screwed on. When this type of nut lock is used, the molded body is preferably recessed as at 6 for receiving the same, the nut lock being engaged by a side wall of the recess to hold the molded body and nut lock in assembled relationship with the latter in its normal non-flattened shape. Preferably at least that portion of the surface of the nut lock which is engaged by a side wall of the recess when the nut lock is in its non-flattened condition is provided with one or more projections, herein generically referred to as roughening, for more securely holding the molded body and nut lock in assembled relationship. In the illustrated embodiment the entire outer surface of the nut lock is roughened by knurling 7.

Figure 5:
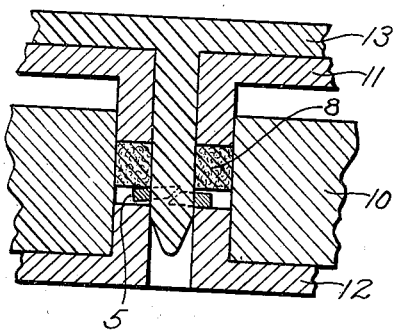
Figs. 5 and 6 are sectional views illustrating one method of making the packing shown in Figs. 1 to 4.
Figure 2:
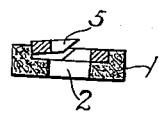
Fig. 2 is a sectional view of the packing taken on the line 2—2 of Fig. 3.
Figure 3:
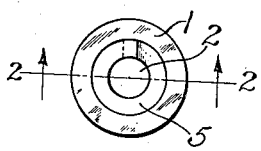
Fig. 3 is a top plan view of the packing.
Figure 6:
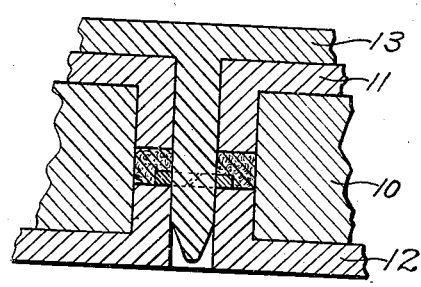
Figure 4:
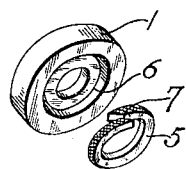
Fig. 4 is an exploded view of the packing.

In Figs. 5 and 6 is shown the now preferred method of making a disc type packing having as a part thereof a split washer nut lock. The essence of the illustrated method is in molding the body of the packing around the split washer nut lock while maintaining the latter in a flattened condition and then allowing the split washer to assume its normal non-flattened shape.

A cold pressed blank 8 of moldable material is provided, the moldable material preferably comprising rubber, asbestos fiber, and curing and reinforcing agents such that the material when subjected to molding heat and pressure will remain relatively stiff and hard. The blank 8 and a nut lock 5 are placed in a mold as shown in Fig. 5, the mold preferably comprising a main plate 10, top and bottom plates 11 and 12, and a follower plate 13. The mold is then subjected to heat and pressure sufficient to compress and cure the blank 8. As the moldable material of the blank is such as to remain relatively stiff and hard during the molding step, the split washer nut lock is flattened as shown in Fig. 6 when the molding pressure is applied, thus forming its own recess within the molded body. After the moldable material has been cured, the packing is removed from the mold, the split washer is allowed to assume its normal non-flattened shape, and the body is given a finishing grinding to accurately size it.

Various changes and modifications within the scope of the appended claims will be apparent to those skilled in the art.

I claim:

1. A packing comprising in combination a molded hard body member having a recess therein, and a nut lock positioned within said recess and engaged by a side wall thereof for holding the body and nut lock in assembled relationship.

2. A packing comprising in combination a molded hard body member having a recess therein, and a split washer nut lock positioned within said recess and engaged by a side wall thereof for holding the body and nut lock in assembled relationship.

3. A packing comprising in combination a molded hard body member having a recess therein, and a nut lock positioned within said recess and having a roughened surface engaged by a side wall of said recess for holding the body and nut lock in assembled relationship.

4. A packing comprising in combination a molded hard body member, and a split washer nut lock within said body member with a portion thereof in intimate molded contact with the body member and with another portion thereof projecting outward beyond the adjacent portions of the body member.

5. A packing comprising in combination a molded hard body member, and a partially exposed nut lock within said body member, said nut lock having at least a portion of its surface roughened and in intimate molded contact with the body member.

6. The method of making a packing comprising molding a split washer nut lock within a body of moldable material while maintaining the nut lock in a flattened condition, and allowing the nut lock to assume its normal non-flattened shape.

7. The method of making a packing comprising providing a mold, placing in the mold a split washer nut lock and a quantity of moldable material sufficient to form a molded packing body, closing the mold and applying pressure thereto to compress the moldable material and flatten the nut lock, curing the compressed moldable material, and removing the packing from the mold and allowing the nut lock to assume its normal non-flattened shape.

HARRY WHITWORTH.